(12) United States Patent
Debnath et al.

(10) Patent No.: US 11,256,113 B2
(45) Date of Patent: Feb. 22, 2022

(54) OPTICAL STRUCTURE AND METHOD OF FABRICATING AN OPTICAL STRUCTURE

(71) Applicant: University of Southampton, Hampshire (GB)

(72) Inventors: Kapil Debnath, Hampshire (GB); Graham Reed, Hampshire (GB); Shinichi Saito, Hampshire (GB)

(73) Assignee: University of Southampton, Southampton (GB)

( * ) Notice: Subject to any disclaimer, the term of this patent is extended or adjusted under 35 U.S.C. 154(b) by 436 days.

(21) Appl. No.: 16/324,748

(22) PCT Filed: Aug. 9, 2017

(86) PCT No.: PCT/GB2017/052342
§ 371 (c)(1),
(2) Date: Feb. 11, 2019

(87) PCT Pub. No.: WO2018/029466
PCT Pub. Date: Feb. 15, 2018

(65) Prior Publication Data
US 2019/0250434 A1      Aug. 15, 2019

(30) Foreign Application Priority Data

Aug. 11, 2016 (GB) .................................... 1613791

(51) Int. Cl.
*G02B 6/10* (2006.01)
*G02F 1/025* (2006.01)
*G02F 1/015* (2006.01)

(52) U.S. Cl.
CPC ............. *G02F 1/025* (2013.01); *G02F 1/0152* (2021.01); *G02F 2201/063* (2013.01); *G02F 2202/105* (2013.01)

(58) Field of Classification Search
CPC .. G02F 1/025; G02F 1/0152; G02F 2201/063; G02F 2202/105
See application file for complete search history.

(56) References Cited

U.S. PATENT DOCUMENTS 6,845,198 B2    1/2005  Montgomery et al.
8,362,494 B2    1/2013  Lo et al.
(Continued)

FOREIGN PATENT DOCUMENTS

WO      2015/112921 A1    7/2015

OTHER PUBLICATIONS

International Search Report and Written Opinion for corresponding Patent Application No. PCT/GB2017/052342 dated Oct. 6, 2017.
(Continued)

*Primary Examiner* — Ellen E Kim
(74) *Attorney, Agent, or Firm* — Renner, Otto, Boisselle & Sklar, LLP

(57) ABSTRACT

A method of fabricating an optical structure comprises providing a layer of single crystal crystalline silicon supported on an insulating surface of a silicon substrate; using etching to remove part of the silicon layer and define a side wall which is non-parallel to the insulating surface of the substrate; forming a layer of insulating material over the side wall; forming a further layer of silicon over at least the insulating material; and removing the silicon of the further layer to a level of the layer of silicon such that the layer of insulating material occupies a slot between a portion of silicon in the layer and a portion of silicon in the further layer, a thickness of the layer of insulating material defining a width of the slot.

18 Claims, 11 Drawing Sheets

(56) References Cited

U.S. PATENT DOCUMENTS

| | | |
|---|---|---|
| 9,310,629 B2 | 4/2016 | Patel et al. |
| 2002/0134749 A1 | 9/2002 | Cho |
| 2002/0151095 A1 | 10/2002 | Kim et al. |
| 2004/0129958 A1* | 7/2004 | Koh ..................... H01P 1/2039 257/275 |
| 2007/0297709 A1 | 12/2007 | Montgomery et al. |
| 2011/0176762 A1 | 7/2011 | Fujikata et al. |
| 2011/0311178 A1 | 12/2011 | Fujikata et al. |
| 2013/0064491 A1 | 3/2013 | Fujikata et al. |
| 2015/0049978 A1 | 2/2015 | Fujikata et al. |
| 2015/0192745 A1* | 7/2015 | Yamazaki ............ G02B 6/4292 385/83 |
| 2015/0311341 A1* | 10/2015 | Hur ................. H01L 21/823807 257/190 |

OTHER PUBLICATIONS

British Search Report corresponding to Application No. GB 1613791.1 dated Feb. 6, 2017.

\* cited by examiner

A)

B)

OPTICAL STRUCTURE AND METHOD OF FABRICATING AN OPTICAL STRUCTURE

BACKGROUND OF THE INVENTION

The present invention relates to optical structure and devices and methods for fabricating such structures and devices.

Substantial research is invested in the realisation of components for optical networks that have silicon as a base material. This is motivated by a desire to integrate electronics and optics on the same platform, to enable an increase in integration density and improved device performance. Also, the use of silicon enables access to the attractive and established complementary metal-oxide-semiconductor (CMOS) technology for integrated circuit construction. Hence, silicon-based photonic devices are of great interest.

A component of particular importance is the electro-optic modulator for the modulation of optical signals carried in a network. Desirably such modulators are energy efficient and operable at high speeds. In a silicon platform, free carrier dispersion effects can be exploited to achieve modulation, by using changes in free carrier concentration in a waveguiding material to modulate the material's refractive index and hence modulate an optical signal in the waveguide. The required change in free carrier concentration in electro-optic devices can be achieved by injection, depletion, accumulation or inversion of the carrier. Depletion and accumulation processes do not rely on silicon's relatively long minority carrier lifetime, unlike injection processes, so are generally faster. As a result, high speed electro-optic modulation demonstrated in silicon is often based on these effects.

Previously, high speed silicon modulators have been proposed based on p-n junctions operating in depletion mode. Although high modulation speeds are possible, the electro-optic effect is weak so long interaction lengths (of the order of millimetres) are needed, and the resultant large $V_\pi L_\pi$ values (the product of the voltage and waveguide length required to achieve a π radian phase shift) are a major drawback in such devices. Performance may be improved by operating the devices in the accumulation mode, which provides a higher charge density and a correspondingly stronger electro-optic effect. This requires the addition of an insulating layer between the p and n regions of the junction, to give a capacitor-type structure. U.S. Pat. No. 6,845,198 describes an example device of this type. The modulator is formed on a silicon-on-insulator (SOI) platform, and comprises a thin oxide (insulating) layer sandwiched between complementary doped partially overlapping silicon layers (body and gate), where the layers are successively stacked on a substrate. The overlapping section forms an optical waveguide for propagation of an optical mode in the transverse direction. In operation, voltage is applied across the structure to cause charge to accumulate on either side of the insulating layer, producing a change in refractive index of the waveguide that translates to a phase change in a propagating optical mode. Operation via carrier accumulation allows high modulation speeds. However, the stacked structure is necessarily non-planar (it occupies multiple planes or layers in the device), and is hence difficult to integrate with and into other optical devices such as ring resonators, rib waveguides and photonic crystal waveguides.

An alternative is to use a planar configuration. U.S. Pat. Nos. 8,362,494 and 9,310,629 describe examples of such devices, in which modulators operating in accumulation mode are formed from a vertical insulating layer disposed between two silicon gate and body regions, all arranged on the same substrate and hence in the same plane. The insulating layer may be fabricated by making a slot in a silicon layer and filling it with a dielectric material. However, the described fabrication techniques result in devices with various drawbacks. For example, surface roughness of the vertical walls of the slot and hence at the silicon-dielectric interface, plus imperfections in the interface arising from the filling step, lead to optical losses, as does a use of polycrystalline silicon. The minimum achievable width for the dielectric layer may also be limited.

Enhanced devices with lower loss and higher speed and improved fabrication techniques for producing such devices are therefore of interest.

SUMMARY OF THE INVENTION

Accordingly, a first aspect of the invention is directed to a method of fabricating an optical structure, the method comprising providing a layer of single crystal crystalline silicon supported on an insulating surface of a silicon substrate; using etching to remove part of the silicon layer and define a side wall which is non-parallel to the insulating surface of the substrate; forming a layer of insulating material over the side wall; forming a further layer of silicon over at least the insulating material; and removing the silicon of the further layer to a level of the layer of silicon such that the layer of insulating material occupies a slot between a portion of silicon in the layer and a portion of silicon in the further layer, a thickness of the layer of insulating material defining a width of the slot.

The etching may be anisotropic wet etching.

The layer of single crystal crystalline silicon may be supported on the insulating surface of the silicon substrate so that the <111> crystal plane of the silicon is non-parallel to the insulating surface, and in which the etching defines a side wall lying in the <111> crystal plane.

The method may further comprise crystallising the silicon of the further layer so that it forms a single crystal structure with the silicon in the layer. The crystallisation may use the silicon in the layer as a seed.

The anisotropic wet-etching may include depositing a sacrificial mask layer over the crystalline silicon before wet-etching to define the side wall, and removing the sacrificial mask layer after forming the layer of insulating material and before forming the further layer of silicon. Alternatively, the anisotropic wet-etching may include depositing a sacrificial mask layer over the crystalline silicon before wet-etching to define the side wall, and removing the sacrificial mask after forming the further layer of silicon.

The insulating material may be a dielectric. For example, the insulating material may be an oxide. The layer of insulating material may be formed to a thickness of 50 nm or less, or a thickness of 10 nm or less, or a thickness of 5 nm or less, or a thickness of 2 nm or less, or a thickness of 1 nm or less.

The layer of single crystal crystalline silicon may be arranged so that its <111> crystal plane is at an angle to the insulating surface in the range of 42 degrees to 48 degrees, or 40 degrees to 50 degrees, or 35 degrees to 55 degrees, or 30 degrees to 60 degrees. The <111> crystal plane may be at an angle of 54.7 degrees to the insulating surface, or at an angle of substantially 45 degrees to the insulating surface. Alternatively, the layer of single crystal crystalline silicon may be arranged so that its <111> crystal plane is substantially orthogonal to the insulating surface.

The etching may define the side wall to be at an angle to the insulating surface of the substrate in the range of 42 degrees to 48 degrees, or 40 degrees to 50 degrees, or 35 degrees to 55 degrees, or 30 degrees to 60 degrees, or at an angle of 54.7 degrees to the insulating surface, or at an angle of substantially 45 degrees to the insulating surface, or substantially orthogonal to the insulating surface.

The method may further comprise shaping the portions of silicon and the layer of insulating material to form a desired structure for waveguiding in which the slot extends in an optical propagation direction of the waveguiding structure, and/or may further comprise doping the portions of silicon to provide different conductivity types, and/or may further comprise configuring the optical structure for operation as an electro-optic modulator.

A second aspect of the invention is directed to an optical structure comprising: a silicon substrate with a surface insulating layer; a first portion of silicon supported on the insulating surface of the substrate and having a first side wall non-parallel and non-perpendicular to the said insulating surface, the silicon being single crystal crystalline silicon; a second portion of silicon supported on the insulating surface of the substrate and having a second side wall non-parallel and non-perpendicular to the said insulating surface and facing the first side wall so as to define a slot between the first and second side walls; and an insulating material disposed in the slot.

The first side wall may lie in the <111> crystal plane of the first portion of silicon.

A third aspect of the invention is directed to an optical structure comprising: a silicon substrate with a surface insulating layer; a first portion of silicon supported on the insulating surface of the substrate and having a first side wall non-parallel to the said insulating surface, the silicon being single crystal crystalline silicon and the first side wall lying in the <111> crystal plane of the silicon; a second portion of silicon supported on the insulating surface of the substrate and having a second side wall non-parallel to the said insulating surface and facing the first side wall so as to define a slot between the first and second side walls; and an insulating material disposed in the slot.

The first and second portions of silicon and the insulating material may define a waveguiding plane, the slot extending in an optical propagation direction through the waveguiding plane. The optical propagation direction may exhibit an optical propagation loss of 4 dB per cm or less.

The second portion of silicon may be polycrystalline silicon or amorphous silicon, or may be single crystal crystalline silicon. The second side wall may lie in the <111> crystal plane of silicon of the second portion of silicon.

The insulating material may be a dielectric material, for example an oxide. The dielectric material may be one of silicon oxide, hafnium oxide, hafnium silicate, zirconium oxide, zirconium silicate, oxynitride, air, erbium-doped silicon oxide, erbium-doped tantalum pentoxide, erbium-doped aluminium oxide, erbium silicate and silicon nitride.

The first side wall may be at an angle to the insulating surface of the substrate in the range of 42 degrees to 48 degrees, or 40 degrees to 50 degrees, or 35 degrees to 55 degrees, or 30 degrees to 60 degrees. For example, the first side wall may be at an angle of 54.7 degrees to the insulating surface of the substrate, or the first side wall may be at an angle of substantially 45 degrees to the insulating surface of the substrate. In other cases, the first side wall may be substantially orthogonal to the insulating surface of the substrate.

The first side wall and the second side wall may be parallel to each other, so as to define a slot of a constant width. Alternatively, the first side wall and the second side wall may be non-parallel to each other. The slot may have a width of 50 nm or less, or a width of 10 nm or less, or a width of 5 nm or less, or a width of 2 nm or less, or a width of 1 nm or less.

The first portion of silicon and the second portion of silicon may be shaped to define a rib waveguide protruding above the insulating surface of the substrate, the slot extending along a length of the rib waveguide.

The first portion of silicon and the second portion of silicon may be doped to provide different conductivity types. The optical structure may further comprise a first electrical connection to the first portion of silicon and a second electrical connection to the second portion of silicon. The structure may be configured for operation as an electro-optic modulator. The electro-optic modulator may be configured for operation by accumulation of free charge carriers.

A fourth aspect of the invention is directed to an optical or electro-optical device comprising an optical structure according to the second or third aspects.

A fifth aspect of the invention is directed to an optical structure fabricated according to the method of the first aspect.

A sixth aspect of the invention is directed to an optical waveguiding structure comprising: a silicon substrate with a surface insulating layer; a first portion of silicon supported on the insulating surface of the substrate and having a first side wall non-parallel to the said insulating surface, the silicon being single crystal crystalline silicon; a second portion of silicon supported on the insulating surface of the substrate and having a second side wall non-parallel to the said insulating surface and facing the first side wall so as to define a slot between the first and second side walls; and an insulating material disposed in the slot; in which the first and second portions of silicon and the insulating material define a waveguiding plane and the slot extends in an optical propagation direction through the waveguiding plane; and the structure further comprises a plurality of supporting fins extending from side walls of the first and second portions of silicon opposite to the first and second side walls in a direction non-parallel to the optical propagation direction.

The first side wall may lies in the <111> crystal plane of the first portion of silicon. The first side wall may be at an angle to the insulating surface of the substrate in the range of 42 degrees to 48 degrees, or 40 degrees to 50 degrees, or 35 degrees to 55 degrees, or 30 degrees to 60 degrees, or at an angle of 54.7 degrees to the insulating surface of the substrate, or at an angle of substantially 45 degrees to the insulating surface of the substrate, or is substantially orthogonal to the insulating surface of the substrate.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, an optical structure and/or a method of fabricating an optical structure may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
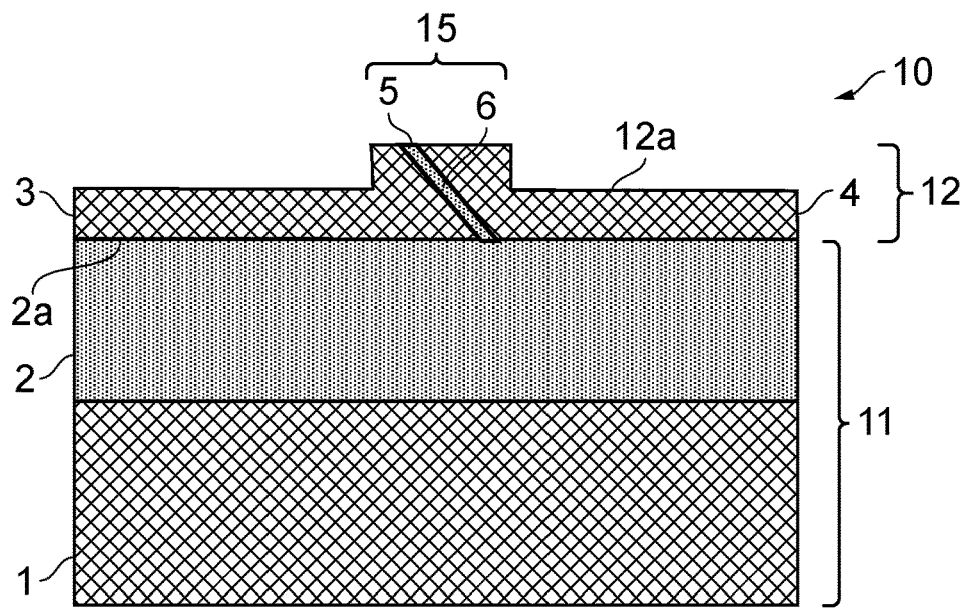
FIG. 1 shows a cross-sectional schematic view through a first example optical structure.

FIG. 1 shows a schematic cross-sectional view through an example optical device according to an embodiment (not to scale). The device 10 is a silicon-on-insulator (SOI) device, and as such comprises a lowest layer 1 of silicon (Si) supporting a layer 2 of silicon dioxide ($SiO_2$), with an uppermost layer (plane) 12 including silicon structures, as will be described. For the purposes of this disclosure, the silicon layer 1 and silicon dioxide layer 2 are together considered as a substrate 11 which supports optical waveguide features located in the planar layer 12. Other insulating materials than silicon dioxide may be used for the layer 2, and this layer 2 forms an insulating surface of the substrate 11 on which the structures of the uppermost layer 12 are supported.

The planar layer 12 comprises a first region or portion 3 of silicon and a second region or portion 4 of silicon, each disposed directly on an upper surface 2a of the silicon dioxide layer 2. The first portion 3 comprises crystalline silicon (c:Si), being in the form of a single crystal of silicon, with no crystal boundaries being present. The second portion 4 may also comprise c:Si, but may instead comprise polycrystalline silicon (poly-silicon) having multiple crystals with boundaries between, or amorphous silicon. Crystalline silicon has superior optical properties, with an optical loss around an order of magnitude less than that of poly-silicon (in which scattering occurs at the crystal grain boundaries). Hence a device in which both silicon regions 3, 4 in the planar layer are formed from c-Si will offer better performance.

Example dimensions for the various layers and portions are about 600 µm depth for the lowest silicon layer 1, about 2 µm depth for the silicon dioxide layer 2, and about 0.2 µm to 0.5 µm depth for the first and second silicon portions 3, 4. The term "depth" in this context refers to the vertical direction as depicted, i.e. the thickness of the layers in the direction of stacking. Other depths for the various layers may alternatively be used, depending on particular requirements for the final device.

The first and second silicon portions 3, 4 are slightly separated from each other within the planar layer 12, to define an intervening slot region 5 formed by opposing side walls of the two portions 3, 4. The slot 5 is filled with an electrically insulating material 6, typically a dielectric. The insulating material 6 contacts the side walls and is supported on the upper surface 2a of the silicon dioxide layer 2, thereby fully occupying the capacity of the slot 5. The width of the slot 5, defined by the spacing of the opposing silicon side walls, is very narrow compared with the vertical thickness of the various layers. In this example the width of the slot is constant (both through its depth and along its length), but it need not be. The width t can be any thickness as required, but is usefully very small, enabling compact devices. For example, the slot width may be 50 nm or less, for example 10 nm or less, and even in some cases 2 nm or less or 1 nm or less. Dielectric layers on this small scale can be conveniently fabricated using techniques described herein, for example.

The first silicon portion 3, the insulating slot region 5 and the second silicon portion 6 together form a silicon-insulator-silicon structure suitable, with some further fabrication steps (described further below), for electro-optic operation, for example as an electro-optic modulator. The presence of the insulator layer allows operation as an accumulation-type modulator. Importantly, the three regions lie in the same layer 12 or plane of the device 10, so the device can be conveniently optically coupled to other optical components (such as incoming and outgoing optical waveguides) with minimal optical loss. The upper surface 12a of the planar layer 12 is shaped to comprise an upstanding ridge or rib 15 that includes the insulating slot 5 and the immediately adjacent parts of the first and second silicon portions 3, 4. The ridge 15 extends in the transverse direction (into the plane of the page, in the depicted orientation) with the slot 5 also extending in this direction, along the ridge. The ridge 15 forms an optically confining structure to act as a waveguide, along which an incident optical beam may propagate in the known manner. One or more additional layers of suitable optical materials may added over the planar layer 12, depending on the intended function of the device 10.

As depicted in FIG. 1, the opposing side walls of the silicon portions 3, 4 are sloped so that they, and hence also the slot region 5, lie at an angle within the plane of the layer 12, between the horizontal direction (parallel to the plane of the layer 12 and the layers of the substrate 11) and the vertical direction (orthogonal to the plane of the layer 12 and the layers of the substrate 11). Hence, in this example, the side walls and the slot are non-parallel and non-perpendicular to the substrate.

Figure 2:
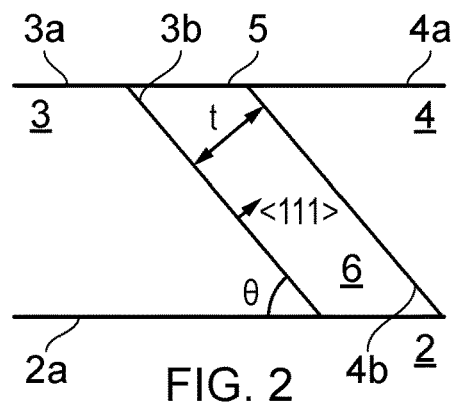
FIG. 2 shows a close-up view of a portion of the optical structure of FIG. 1.

FIG. 2 shows a close-up schematic representation of the region of the device 10 containing the slot 5. The first portion of silicon 3 sits on the upper surface 2a of the silicon dioxide layer 2 in the substrate, and has an upper surface 3a of its own, and a side wall 3b which is sloped at an angle θ to the horizontal surface 2a of the substrate. The second portion of silicon 4 sits also on the upper surface 2a of the substrate, has an upper surface 4a, and a side wall 4b facing the side wall 3b of the first silicon portion 3. The two opposing sides walls 3b, 4b are parallel in this example and spaced apart by a distance t (in the direction perpendicular to the walls). This spacing forms the slot 5, within which is disposed the dielectric material 6. Hence the slot 5 and the dielectric material 6 also form the same angle θ to the horizontal surface of the substrate 2a. A slot angled in this way may be advantageous over a vertical or horizontal slot for some applications. In particular, an angled slot gives reduced polarisation dependence when coupling light into the waveguide, for example from an optical fibre. The amount of independence compared to a vertical or horizontal slot varies with angle, with a 45 degree angle giving full polarisation independence for incident plane polarised light. Thus, an angled slot device can be more easily and efficiently integrated with other optical components. Angles near to 45 degrees will give moderate polarisation independence so are still useful, for example the slot may be at an angle in the range of 40 degrees to 50 degrees, or 35 degrees to 55 degrees, or 30 degrees to 60 degrees. Other angles may also be useful depending on the intended application and the expected polarisation angle of incident light. Consequently, the slot may take any angle between 1 degree and 90 degrees to the surface of the supporting substrate.

Importantly, in some embodiments the side wall 3b of the first silicon portion lies in the <111> (using Miller indices) crystallographic plane of the c:Si of which the first silicon region is comprised. In a common crystallographic orientation of silicon wafers often used in the semiconductor industry, the upper face of a wafer lies in the <100> plane (or equivalently the <010> or <001> planes). If this orientation is adopted here for the first silicon portion 3, its upper face 3a (and its parallel lower face lying on the upper face 2a of the substrate) will lie in the <100> plane, and, given the crystal structure of silicon, the <111> plane and hence the side wall 3b will make an angle θ of 54.7 degrees to the horizontal (this being the angle between the <111> and <100> planes in c:Si). Therefore the slot 5 also lies at 54.7 degrees to the plane of the substrate (and indeed the plane of the planar layer 12 of the device). For a constant slot thickness t, the side wall 4b of the second silicon portion lies at this same angle too. Correspondingly, the side walls 3b, 4b and the slot 5 make an angle of 35.3 degrees to the vertical (orthogonal direction to the planes within the device). As will be appreciated, this amount of slope is reasonably close to the attractive 45 degree slot orientation for polarisation-independent coupling, so is a useful configuration.

If, however, one uses c:Si for the first silicon portion 3 which is not oriented with its upper surface 3a parallel to the <100> plane (or the <010> or <001> plane equivalents), other values of the angle θ can be produced, since the side wall 3a is arranged to lie always within the <111> plane. Thus, the silicon portion 3 can be selected with a desired crystallographic orientation to achieve a desired slot angle, for example a 45 degree angle for polarisation-independence. A 45 degree slot can be made from a c:Si wafer with its planar upper (and lower) surface arranged at an angle of 9.7 degrees to the <100> plane, for example. Fabrication of silicon wafers and substrates oriented away from the <100> plane is non-trivial, but achievable, so that devices according to the invention may be customised to provide a slot at any angle required for various applications.

Figure 3:
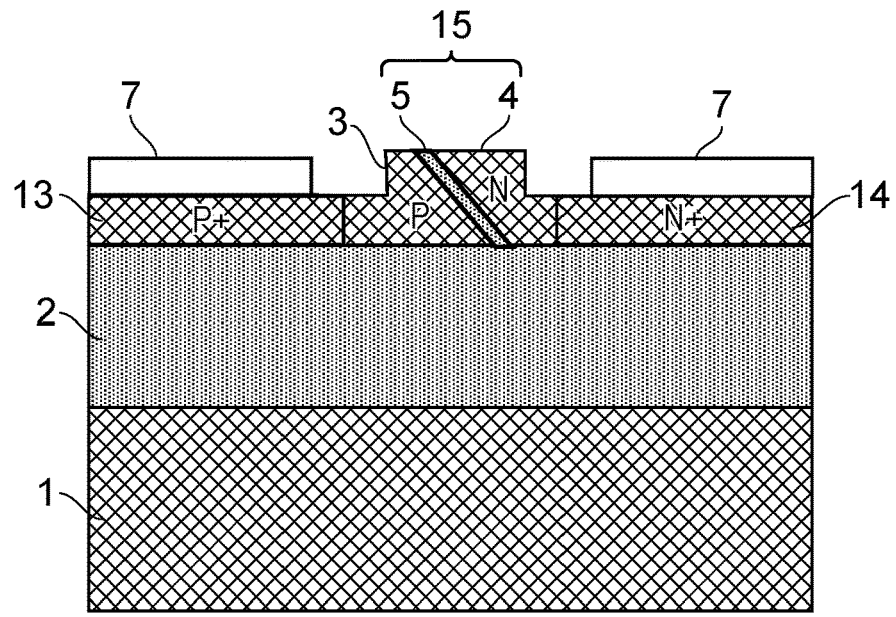
FIG. 3 shows a cross-sectional schematic view of an optical structure such as the FIG. 1 example configured as an electro-optic modulator.

FIG. 3 shows a cross-sectional schematic view of a device similar to the device 10 of FIG. 1, additionally configured for use as an electro-optic modulator, operable in accumulation mode. To achieve electro-optic operation, it is necessary for the two silicon portions 3, 4 sandwiching the dielectric layer in the slot to be doped for different conductivity types. In this example, the first silicon portion 3 is doped to have p-type conductivity, and the second silicon portion 4 is doped to have n-type conductivity. Any doping technique may be used to achieve the required conductivity types, such as by diffusion or implanting of the dopant into the silicon. Any dopant may be used, according to preference. For example, phosphorus or arsenic atoms may be used to dope silicon to create n-type conductivity, and boron or gallium atoms may be used to dope silicon to create p-type conductivity.

Two electrical contacts 7 are provided, one contact on the first silicon portion 3 and the other on the second silicon portion 4, i.e. on either side of the insulator region defined by the dielectric material 6 in the gap 5. The contacts 7 may be metallic, and may be formed directly on the device surface or accessible by vias, and should be positioned so as to be outside the expected area of light propagating in the waveguide ridge region 15. The two silicon portions 3, 4 and the intervening insulator form a capacitor structure under the application of a voltage across the structure using the contacts 7. For accumulation mode, forward bias operation is used. Free carriers (electrons and holes) flow into and out of the p-doped and n-doped portions of silicon according to the applied voltage, creating an active region in which the refractive index varies with the moving charge. Control of the voltage thus modulates the refractive index and consequently also the phase of propagating light in the waveguide. Electro-optic modulation in accumulation mode accesses a strong electro-optic effect, which allows device lengths to be short for a given level of modulation. Also, charge carrier movement in the accumulation mode offers a high modulation speed. These factors combine so that an accumulation-type device offers the best electro-optic modulation efficiency of the various regimes.

In this example, the areas 13, 14 of the silicon portions 3, 4 which are proximate to the contacts 7 are more heavily doped than the areas in the waveguiding region 15 where optical modulation occurs. This is indicated as "P+" and "N+", in contrast with "P" and "N". The heavier doping may improve the electrical connection between the silicon and the contacts 7, thereby lowering the electrical resistance and hence the RC constant associated with the modulator (capacitor) structure in the waveguiding region 15. Also, the presence of the dopant in the waveguiding region may have an adverse effect on optical properties of the silicon, so a lower concentration of dopant in this area compared to further away may be preferred. Hence, dopant concentration is increased with distance from the optical mode. The concentration of dopant may increase gradually in a continuous manner, or may be increased step-wise (such as at the boundary between the P+ and P and N+ and N areas in FIG. 3).

Figure 4:
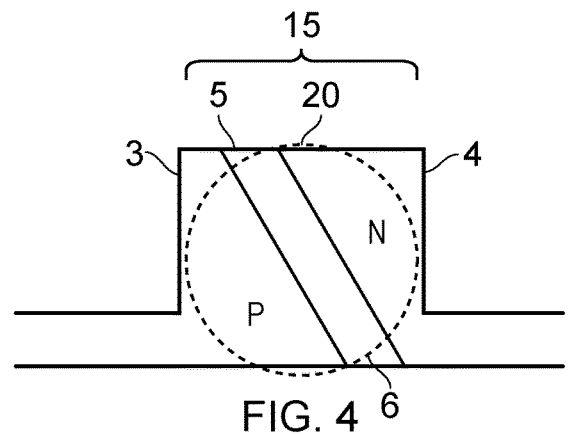
FIG. 4 shows a schematic representation of a waveguiding portion of the FIG. 3 structure with a propagating optical wave.

FIG. 4 shows a schematic representation of the waveguiding region 15, with the approximate location of the transverse optical mode 20 of a propagating light wave indicated by a dotted line. The light wave propagation direction is into (or out of) the page, and optical confinement of the optical mode 20 is achieved by the raised rib shape of the protruding portion 15 (by the refractive index difference between the silicon and the surrounding air (or other material), in the usual waveguiding manner). As can be appreciated, the optical mode overlaps both the p-type and n-type silicon 3, 4 and the dielectric slot 5, so that the refractive index change caused by changing charge carrier density as charge accumulates and depletes under an applied voltage will modulate the propagating light. In particular, by arranging the slot 5 roughly centrally within the waveguiding region 15, the dielectric material 6 coincides with the high intensity central region of the propagating mode, so the change in charge density can cause maximum modulation of the optical phase. The modulator can therefore have a high efficiency.

Figure 5:
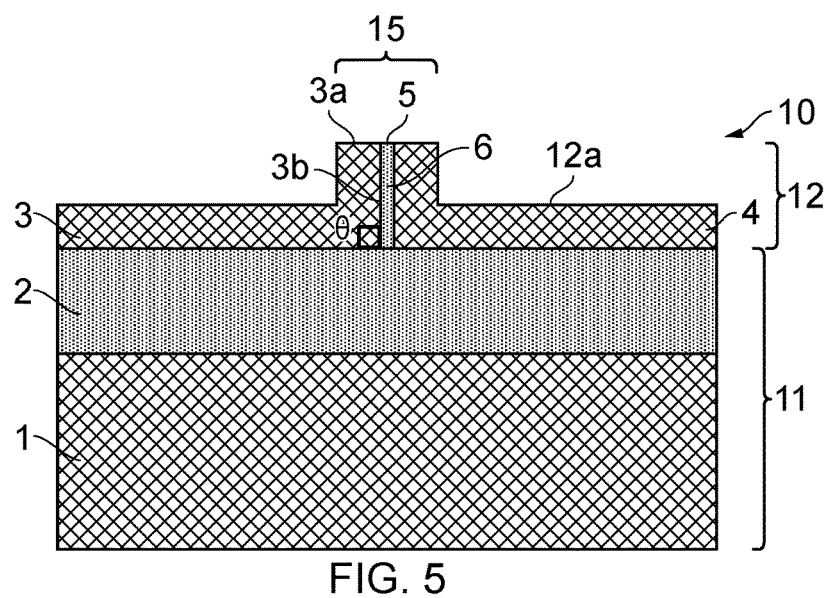
FIG. 5 shows a cross-sectional schematic view through a second example optical structure.

FIG. 5 shows a schematic cross-sectional representation of a second example device 10. This device has the same components and features as the example shown in FIG. 1, with the exception of the angle θ formed by the dielectric slot 5 in the waveguiding region 15. Whereas in FIG. 1, the slot lay at an angle intermediate between 0 degrees and 90 degrees, in this example, the angle θ is approximately a right angle, so that the slot 5, and hence the side wall 3b of the first silicon portion 3, lie at approximately 90 degrees to the plane of the substrate 11 and to the upper surface 3a of the first silicon portion 3. In the depicted orientation, the slot is therefore a vertical slot, orthogonal to the horizontal plane of the substrate 11 and lying orthogonally within the planar layer 12. Nevertheless, the side wall 3b of the first silicon portion 3 is again formed by the <111> crystal plane of the c:Si providing the first silicon portion 3. The c:Si layer used to form the first silicon portion 3 of the device 10 is oriented appropriately to achieve this orientation for the <111> plane. Note that the slot 5 is positioned centrally within the waveguiding region 15 in this example, with equal widths of silicon on each side in the first and second portions 3, 4.

Figure 6:
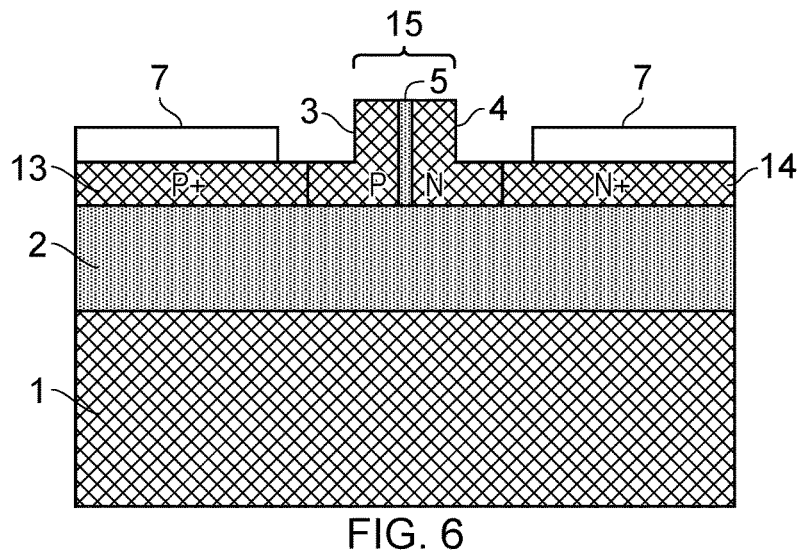
FIG. 6 shows a cross-sectional schematic view of an optical structure such as the FIG. 5 example configured as an electro-optic modulator.

FIG. 6 shows the device of FIG. 5, again as a schematic cross-section, and configured for operation as an optical modulator in the same manner as the FIG. 3 device. The modulator is the same as the FIG. 3 modulator except for the different orientation of the slot 5, at θ=90 degrees. Operation of the modulator is the same as for the FIG. 3 modulator.

Figure 7:
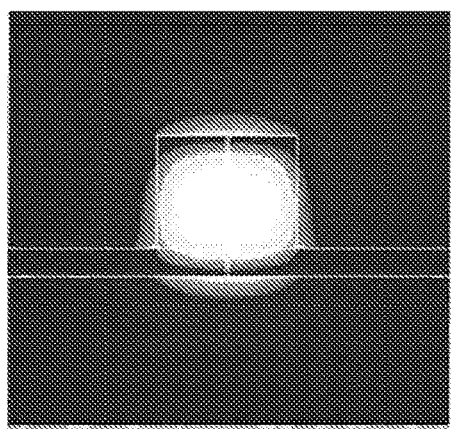
FIG. 7 shows a computer-simulated view of a waveguiding portion of the FIG. 6 structure with a propagating optical wave.

FIG. 7 shows a computer simulated image of the optical mode of a light beam propagating in the waveguide region of a device such that of the FIG. 6 example, with a vertically oriented slot. The bright, high intensity central part of the beam can be appreciated, depicted in white. As with the sloped slot example, the highest intensity light coincides with the dielectric material in the slot, to give high modulation efficiency.

Figure 8:
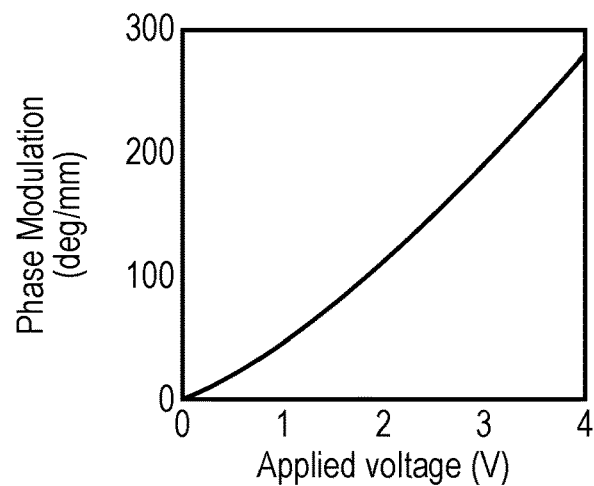
FIG. 8 shows a plot of the results of computer modelling of optical phase modulation produced from an electro-optical modulator according to an example.

FIG. 8 shows a plot of simulated modulation achievable from a device as in the FIGS. 6 and 7 examples operated with forward bias operation in the accumulation mode, as the amount of relative phase change produced for a given applied voltage. The waveguide was modelled to have a length of just 1 mm, since the strong electro-optic effect of accumulation operation enables effective modulation in a short device. The height of the waveguide was 340 nm, the width of the rib or ridge was 400 nm, and the slab height was 100 nm. The width of the slot was 5 nm, and for both the p-type and n-type silicon portions adjacent the slot, the doping concentration was $5 \times 10^{17}/cm^3$. There is a near-linear relationship between phase modulation and applied voltage, particularly at higher voltages, and a large phase change of about 275 deg/mm is produced from just 4 V.

Figure 9:
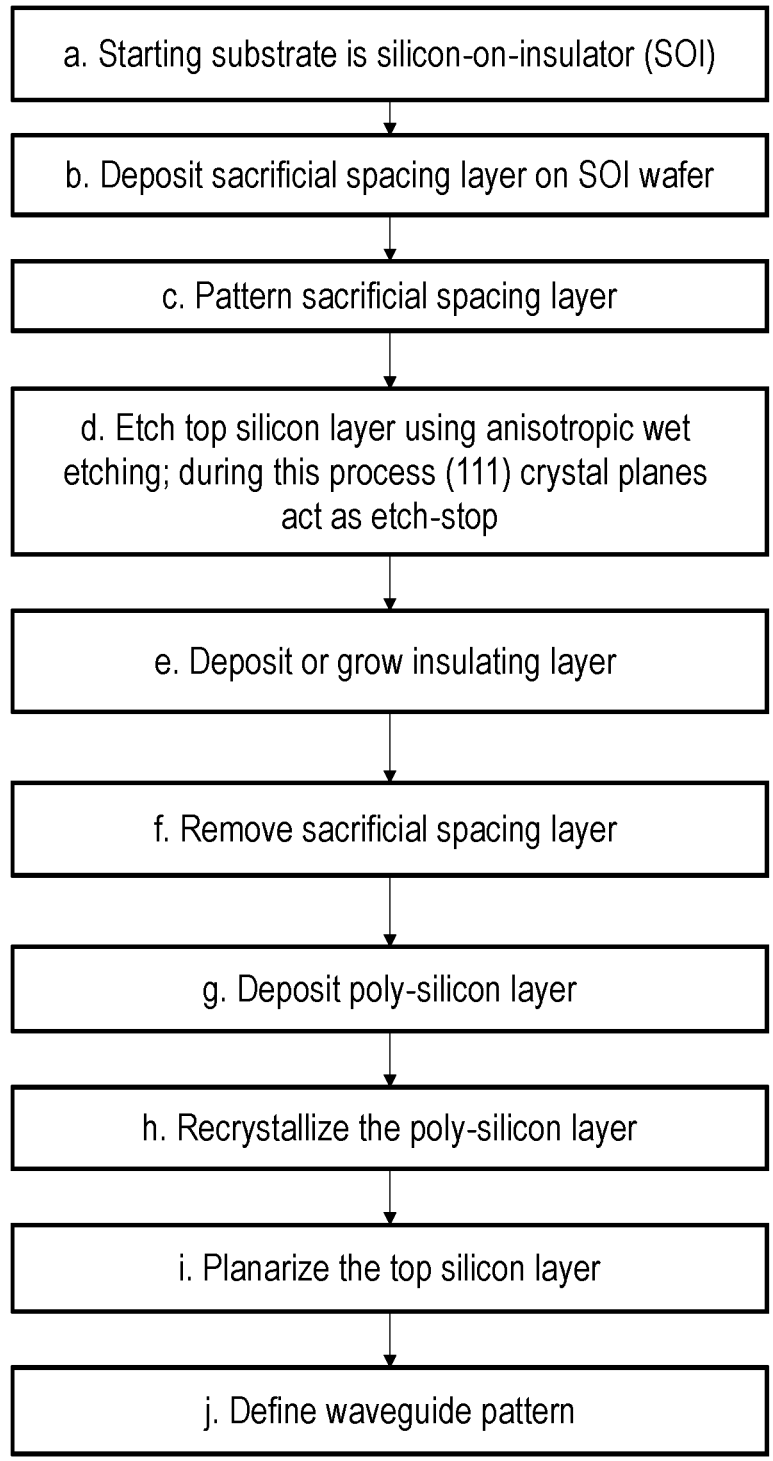
FIG. 9 shows a flow chart of steps in a first example fabrication method.

FIG. 9 shows a flow chart of steps in an example method for fabricating an optical device with an angled dielectric slot waveguide, such as that shown in FIG. 1.

FIGS. 10(a) to 10(j) show schematic cross-sectional views through such a device undergoing fabrication using the steps of the method of FIG. 9.

Returning to FIG. 9, in step (a) the method commences with a starting substrate of a silicon-on-insulator (SOI) configuration. As shown in FIG. 10(a), this may comprise, for example, a base layer 1 of silicon supporting on its upper surface an insulator layer 2 of silicon dioxide, which in turn supports on its upper surface a configurable layer 22 of silicon. In this context, the term "configurable" is used merely to denote that this layer will be configured by the method to produce the final desired optical device. Comparing with FIG. 1, the base layer 1 and insulator layer 2 correspond to the layers of the substrate 11, while the configurable layer 22 will be worked into the first portion of silicon 3. As a starting point for the method, the substrate may comprise all three layers shown in FIG. 10(a), or may comprise the lower two layers making up the substrate 11 of FIG. 1 and the configurable layer 22 is then formed on top, or may comprise only the base layer 1 and the insulating layer 2 and the configurable layer 22 are then formed on top. Each alternative gives a substrate structured as shown in FIG. 10(a), and providing a starting substrate as in step (a) is intended to include these various alternative.

The configurable layer 22 comprises a single crystal of crystalline silicon, denoted c:Si, and also referred to as mono-silicon. Its upper surface 22a and parallel lower surface in contact with the silicon dioxide layer 2 may lie in the <100> plane (or equivalently the <010> or <001> planes) as discussed above, or may lie at an angle to the <100> plane, depending on the desired slope angle for the dielectric slot.

Moving to step (b) of FIG. 9, a sacrificial spacing layer 24 is deposited (or otherwise formed) on the upper surface 22a of the configurable silicon layer 22. As shown in FIG. 10(b), this layer may comprise, for example, silicon nitride ($Si_3N_4$). The sacrificial layer is to act as a mask for subsequent wet etching, so the material used for it should be chosen appropriately, with reference to ease of patterning and resistance to a chosen etchant. Other examples of mask materials include silicon dioxide, gold, silver, copper and chromium, although other materials are not excluded.

In step (c) of FIG. 9, the sacrificial spacing layer 24 is patterned to define a desired mask shape. The patterning may be carried out using any convenient technique, such as photolithography. The purpose of the patterning is to remove a part or parts of the sacrificial spacing layer 24 to produce a mask with an edge 24a aligned along the desired path of the side wall 3b of the first silicon portion 3 in the final device (see FIG. 2). The edge 24a therefore also defines the path of the dielectric slot in the final device. FIG. 10(c) shows the patterned edge 24a, and indicates that in this example about half the sacrificial layer 24 has been removed by the patterning at this cross-sectional position, leaving the underlying c:Si in the configurable silicon layer 22 exposed.

Although production of the mask is shown as a two-stage process following steps (b) and (c), it may be possible to use a single-stage technique to deposit the material of the sacrificial layer 24 directly in the desired mask pattern.

Moving to step (d) of FIG. 9, the configurable silicon layer 22 is etched. The purpose of the etching is to remove the c:Si in the configurable silicon layer 22 which is not protected by the mask of the sacrificial layer 24, leaving just that part (or parts) of the c:Si which lies under the sacrificial layer 24. To achieve this, an anisotropic wet etching process is used. In this context, "anisotropic" indicates that the etching is orientation-dependent, proceeding at different rates in different directions through the crystal; hence anisotropic etching can produce sharp well-defined features. When anisotropic wet etching is applied to c:Si, the etch follows the <111> silicon crystal plane so that this plane acts an etch stop. Consequently, the side wall 3b of the c:Si which is left at the end of etching (the part of the c:Si under the mask 24) lies in the <111> plane. See FIG. 10(d). Hence, the side wall 3b is not necessarily vertical, near vertical or undercut as might be expected from a conventional etching step, but lies in a plane having an angle defined by the overall crystallographic orientation of the c:Si of the configurable silicon layer, and which is non-parallel and either perpendicular or non-perpendicular to the substrate surface. So, if the upper surface 22a of the configurable silicon layer 22 is parallel to the <100> plane, the side wall 3b will lie at an angle of 54.7 degrees to the plane of the configurable silicon layer (as discussed with regard to FIG. 2). Selection of a particular crystal orientation for the configurable silicon layer 22 allows this surface to be positioned at any angle as desired, since the anisotropic wet etching will always remove the c:Si material parallel to the <111> crystal plane. This technique of high anisotropy by etching along crystal planes is also sometime known as crystallographic etching.

The wet etching can be carried out in any preferred manner. A range of wet etchants are available for anisotropic etching of silicon; these include potassium hydroxide (KOH), EDP (aqueous solution of ethylene diamine and pyrocatechol) and tetramethylammonium hydroxide (TMAH). Each of these shows an etch rate many times higher in <100> crystal directions than in <111> crystal directions, so are suitable for preserving the <111> plane in the c:Si layer 22. However, KOH poses contamination issues in the context of substrates such as the FIG. 10 example since it may introduce mobile potassium ions into the silicon dioxide layer 2. EDP is corrosive and carcinogenic. Hence, TMAH may be the preferred etchant.

In step (d), the anisotropic wet etching is continued until all the silicon material in the configurable layer 22 which is exposed by the mask 24 has been removed and the underlying silicon dioxide layer 2 is revealed. The remaining c:Si under the mask 24 forms the first silicon portion 3 of the device (see FIG. 1)

In a next step (e) of FIG. 9, a layer of insulating material 6 is laid down on the <111> side wall 3b of the first silicon portion 3. This may be by deposition (such as chemical vapour deposition or physical vapour deposition) or growth of thermal oxide, for example. The mask 24 remains in place to protect the upper surface 3a of the first silicon portion. Depending on technique and materials, oxidation may prevent the insulating material from forming on the mask material. The insulating material may be selected according to preference. It may be a dielectric, and the dielectric may be an oxide. Examples include silicon oxide, hafnium oxide, hafnium silicate, zirconium oxide, zirconium silicate, oxynitride, silicon nitride, air, erbium-doped silicon oxide, erbium-doped tantalum pentoxide, erbium-doped aluminium oxide, erbium silicate and polycrystalline silicon; other materials are not excluded. FIG. 10(e) shows an example in which silicon dioxide is used as the insulating material 6. The material might be chosen for its free carrier properties, to achieve a particular switching speed in an electro-optic modulator, or by reference to its optical properties since it forms part of the waveguide. The material may be doped with an optically active material such as silicon oxide doped with erbium, for use of the device as an on-chip optical amplifier. Air might be used to provide a device for chemical sensing. More than one material might be included in a single slot. The layer of insulating material 6 has an outer surface 6a opposite to its underside which is in contact with the side wall 3b of the first silicon portion 3.

The insulating material 6 is the material which will occupy the slot 5 in the final device, and its thickness in the direction orthogonal to the <111> side wall 3b defines the width of the slot (t in FIG. 2). Hence, limitations on the final slot width are imposed only by the accuracy and finesse of the technique used to deposit or grow the insulating layer 6. Accordingly, very small and precisely defined slot widths are achievable by this method, and may be of the order of 10 nm or less, such as 5 nm or less or 2 nm or less. Thicker layers and wider slots are of course possible if desired. The use of an approach in which the slot width is defined by the thickness of a grown or deposited layer allows precise control and great flexibility. In particular, the approach is attractive when compared to techniques in which a slot is etched or otherwise excavated in the substrate material and afterwards filled with insulating material; narrow slots of a few nanometres width cannot readily and accurately be formed in this way.

Returning to FIG. 9, in a next step (f) the mask is removed by removing the remaining material of the sacrificial spacing layer 24. As shown in FIG. 10(f), this reveals the upper surface 3a of the first silicon portion 3.

The next stages of the method are for forming the required second silicon portion 4 shown in FIG. 1, on the opposite side of the insulating layer 6. In step (g) of FIG. 9, a layer of silicon 26 is deposited over the entire exposed surface of the device. As shown in FIG. 10(g), the silicon 26 therefore covers the upper surface 3a of the first silicon portion 3, the upper surface 2a of the silicon dioxide layer 2, and the outer surface 6a of the insulating layer 6. The underside of the silicon layer which contacts the outer surface 6a of the insulating layer 6 will form the second side wall 4b of the slot 5 in the waveguide of the final device.

The silicon layer 26 may comprise polysilicon (crystalline silicon with multiple crystals separated by crystal boundaries) or amorphous silicon.

Moving to step (h) of FIG. 9, the silicon of the silicon layer 26 is recrystallised. This may be done by an annealing process. For enhanced device performance, both the first and second silicon portions of the waveguide region may comprise crystalline silicon. To produce this from the amorphous silicon or polysilicon of the layer 26, the crystalline silicon of the first silicon portion 3 acts as a seed layer during the annealing. The mono-crystalline structure propagates from the first silicon portion into the overlying part of the silicon layer 26 and then throughout the whole silicon layer 26. After the recrystallisation, both the first silicon portion 3 and the silicon layer 26 are a single silicon crystal supported on the silicon dioxide layer 2, with the insulating layer 6 embedded within it. This is evident from FIG. 10(h), which represents the silicon portions 3, 26 with a single shading style to indicate the single crystal structure.

Optical propagation loss is less in monocrystalline material compared with polycrystalline material, owing to the absence of scattering at crystal boundaries. Hence in applications such as optical devices according to present embodiments, it is beneficial to use monocrystalline material where possible. Accordingly, the recrystallisation process of step (h) is an attractive and convenient way to achieve a low or reduced loss device. However, propagation will still occur in amorphous and polycrystalline silicon so the recrystallisation may be omitted if the resulting optical loss in the final device is acceptable.

To achieve operation as an electro-optic device using carrier accumulation, such as the modulator of the FIG. 3 example, the portions of silicon on either side of the insulating layer 6 should be electrically isolated from one another, whereas after step (g) or (h) they are a continuous mass of material. Accordingly, a next step in the method is step (i) of FIG. 9, in which the upper surface of the device, namely the top silicon layer 26 plus the underlying first silicon portion 3, is planarised. Material is removed, for example by chemical mechanical polishing (although other methods are not precluded) down to or past the highest level of the insulating material 6 so that the silicon on either side of the insulating material is physically separate, and not in contact. In this way, the top silicon layer 26 is transformed into the second silicon portion 4 of the FIG. 1 example, on the opposite side of the insulating material 6 from the first silicon portion 3, as shown in FIG. 10(i). Each silicon portion 3, 4 has a surface in contact with the insulating material 6, being the side walls 3b, 4b that define the slot 5, filled with insulating (such as dielectric) material. The silicon portions 3, 4 and the intervening dielectric slot 5 are all in the same plane of the device (parallel to the supporting substrate) and comprise the planar layer 12 of FIG. 1. Material of the first and second portions of silicon 3, 4 and the insulating material 6 are all comprised within the resulting planarised upper surface 26a of the device.

In a final device, the planar layer 12 will support waveguiding of an incident light beam. Accordingly the planar layer 12 may be engineered appropriately as a waveguide, to provide optical confinement for a propagating optical mode (as in FIGS. 4 and 7). This is carried out in the final step (j) of FIG. 9, for example by patterning or shaping the planar layer. FIG. 10(j) shows an example of a suitable waveguiding structure, in which the upper surface 26a of the planar layer 12 is shaped (by any convenient manner, such as etching or polishing) into a ridge 15 containing the slot 5 and adjacent parts of the first and second silicon portions 3, 4 standing proud of the remainder of the silicon portions. The ridge 15 and the slot 5 extend transversely into the plane of the page along the required path of the waveguide, and the surrounding air (or other material than might be applied as desired for a given application) provides a refractive index boundary for optical confinement.

Figure 10K:
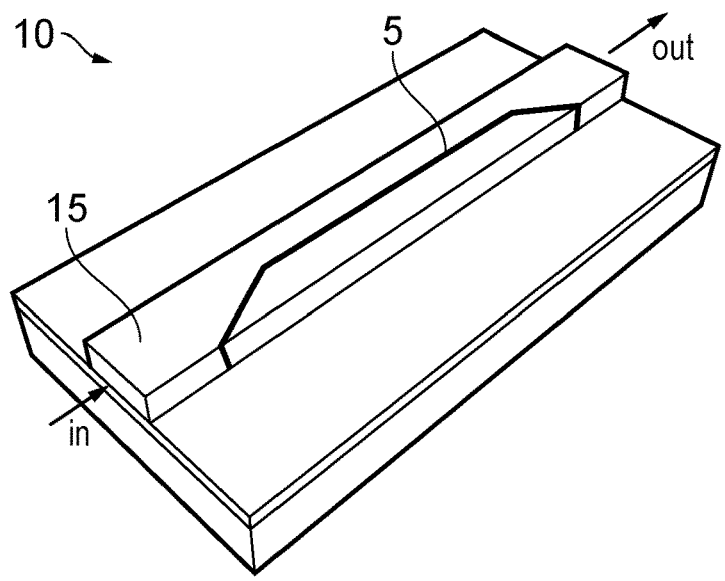
FIG. 10(k) shows a perspective view of an example optical waveguiding device according to an example.

FIG. 10(k) shows a perspective view of a device 10 formed with a ridge waveguiding structure 15 in this way. The light propagation direction along the waveguide is indicated as "in" and out". The exterior edge of the dielectric slot 5 is shown as a heavy line. In this example the slot does not extend centrally within the ridge 15 right to each end of the waveguide, but rather tapers across to one side of the ridge 15 proximate the ends. These tapers avoid abrupt reflective boundaries within the waveguide that could cause undesirable optical loss. Optical coupling efficiencies into and out of the electro-optic region are thereby improved.

The method of FIGS. 9 and 10, and other methods described herein, in which a series of deposition and crystal growth stages are used to build up a slot waveguiding structure from layers (with the slot at any angle to the supporting substrate as discussed further below) is highly attractive in terms of enabling fabrication of a slot structure of any width in which the insulating material completely fills the slot, with no gaps or voids. This is in contrast with the fabrication described in U.S. Pat. No. 9,310,629, for example, which describes how to make a slot waveguide using conventional etching of a slot which is then filled using a deposition technique. Following this process, the inventors have found that it is not possible to properly fill the slot completely, and for slot widths of 15 nm or less it is unavoidable that voids are formed, leading to undesirable optical propagation loss.

FIGS. 11(a) to 11(j) shows a device at different steps of a fabrication method according to a further example. This differs from the example of FIGS. 10(a) to 10(j) in that the slot 5 is formed to have a vertical orientation, that is, it lies orthogonally within the planar layer 12, forming a right angle with the upper surface of the supporting silicon oxide layer 2. The resulting device in FIG. 11(j) is therefore configured as the example in FIG. 5. It can be made following the same steps as summarised in the flow chart of FIG. 9, with an appropriate crystal orientation for the configurable silicon layer 22 for the side wall 3b in the <111> silicon crystal plane to be oriented vertically after anisotropic wet etching (FIG. 11(d)).

Figure 12:
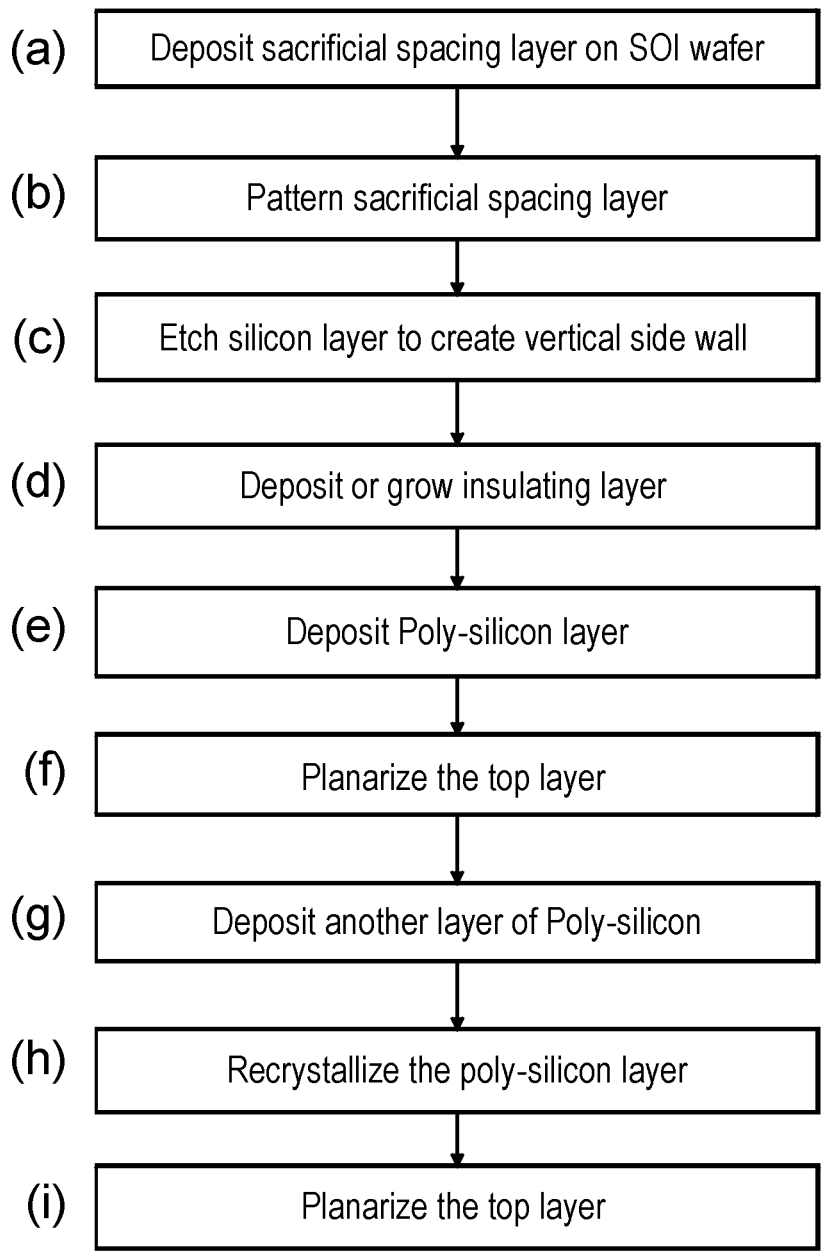
FIG. 12 shows a flow chart of steps in a second example fabrication method.

FIG. 12 shows a flow chart of steps in an alternative fabrication method that produces a same end result as previous methods but performs individual steps in a different order or different manner. FIGS. 13(a) to 13(i) show successive cross-sectional views through an example device being fabricated according to the steps of FIG. 12. In this example, the slot is formed vertically, but this is for illustration only; the slot may be formed based on the <111> silicon crystal plane at any angle in accordance with the preceding description.

In the FIG. 12 method, steps (a) to (d), illustrated in FIGS. 13(a) to 13(d) are substantially the same as steps (a) to (e) of FIG. 9, so that at the end of step 12(d) the device comprises a first portion 3 of c:Si protected by a mask layer 24 of a material such as silicon nitride, and with an insulating layer 6 formed on its side wall 3a. Thus FIG. 13(d) shows a same device as FIG. 11(e). However, whereas the FIGS. 9 and 10 method next removes the sacrificial layer of the mask 24 before laying down poly-silicon, in step (e) of FIG. 12, a layer of poly-silicon 26 (or amorphous silicon) is deposited over the upper surface of the device, that is, so that it covers the upper surface 24a of the sacrificial layer 24, the outer surface 6a of the insulating material 6 and the exposed upper surface 2a of the silicon dioxide layer 2. See FIG. 13(e).

Thus, while material for the two silicon portions is now in place either side of the insulating layer 6, the sacrificial layer 24 is buried within the silicon and requires removal. Hence, a next step (f) in FIG. 12 is to planarise the upper surface 26a of the polysilicon layer 26 (such as by chemical mechanical polishing) down to a level below the lower surface of the sacrificial layer 26, so that all the material of the mask is removed. FIG. 13(f) shows the resulting device, comprising an uppermost planar layer 12 formed from a first silicon portion 3, a second silicon portion 4 and an intervening insulating layer 6 that separates the silicon portions.

If optical losses in the poly-silicon of the second silicon portion 4 can be tolerated, the method of FIG. 12 may be terminated at step (f) and the device in FIG. 13(f) further configured for operation by shaping a waveguide, doping, adding electrical contacts and the like. However, if it is desired to reduce optical loss, the method may proceed to step (g) of FIG. 12, shown in FIG. 13(g), in which a second layer of poly-silicon 28 is applied (by deposition or growth, for example) over the whole upper surface 26a of the device, covering both silicon portions 3, 4 and the insulating material 6.

This extra silicon acts to bridge the first silicon portion 3 to the second silicon portion 4, for the purpose of recrystallisation of the second silicon portion which is performed in step (h) of FIG. 12. The c:Si of the first silicon portion 3 acts as a crystallisation seed during annealing, so that its crystal structure propagates into the second poly-silicon layer 28 and then into the second silicon portion 4. An end result of this is that all the silicon in the planar layer 12 has a single crystal structure, as depicted in FIG. 13(h). However, the crystal extends over the top of the insulating layer 6, connecting the first and second silicon portions 3, 4. The insulating material 6, and the slot it is disposed in, are embedded in the silicon.

Finally, in step (i) of FIG. 12, the device is again planarised, this time to remove the upper surface 26 down to or below the top of the insulating material, so that the first and second silicon portions 3, 4, each now comprising monocrystalline silicon, are isolated from one another. This is shown in FIG. 13(i).

The device may then be configured for waveguiding, such as by formation of a ridge waveguide around the dielectric slot, as in FIG. 11(j).

Figure 10:
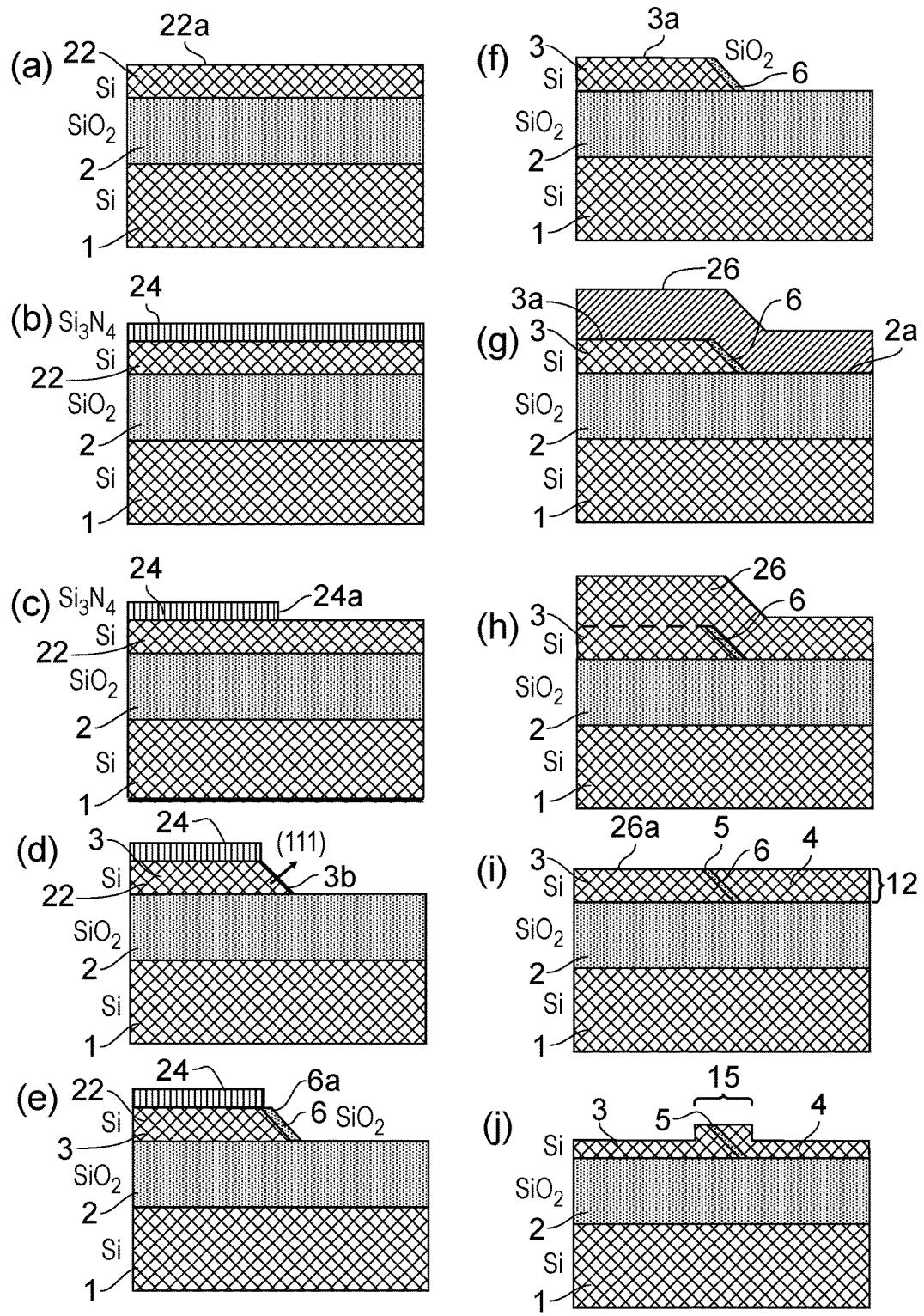
FIGS. 10(a) to 10(j) show schematic representations of an example optical structure at each stage of the FIG. 9 method.
Figure 11:
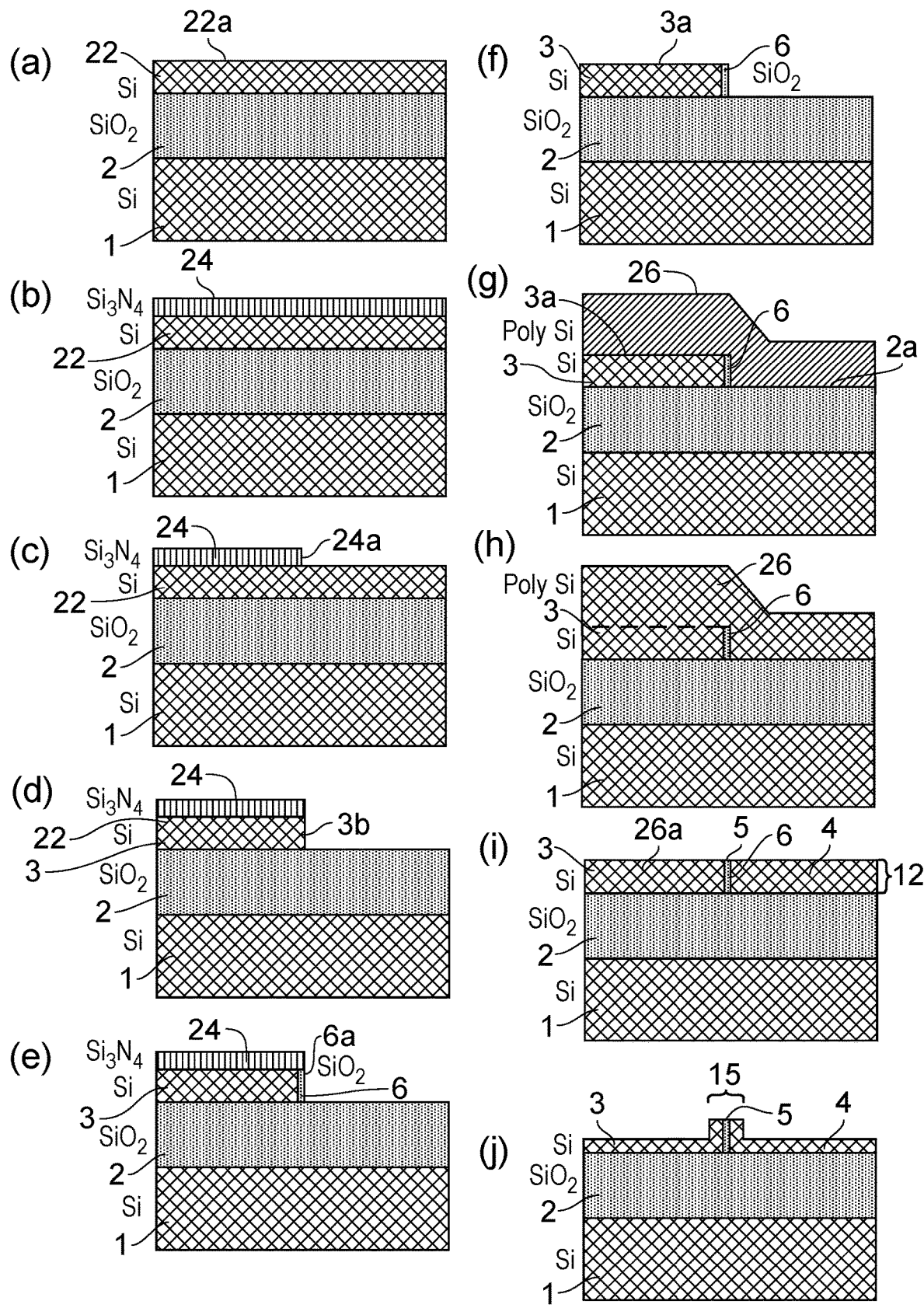
FIGS. 11(a) to 11(j) show schematic representations of a further example optical structure at each stage of the FIG. 9 method.
Figure 13:
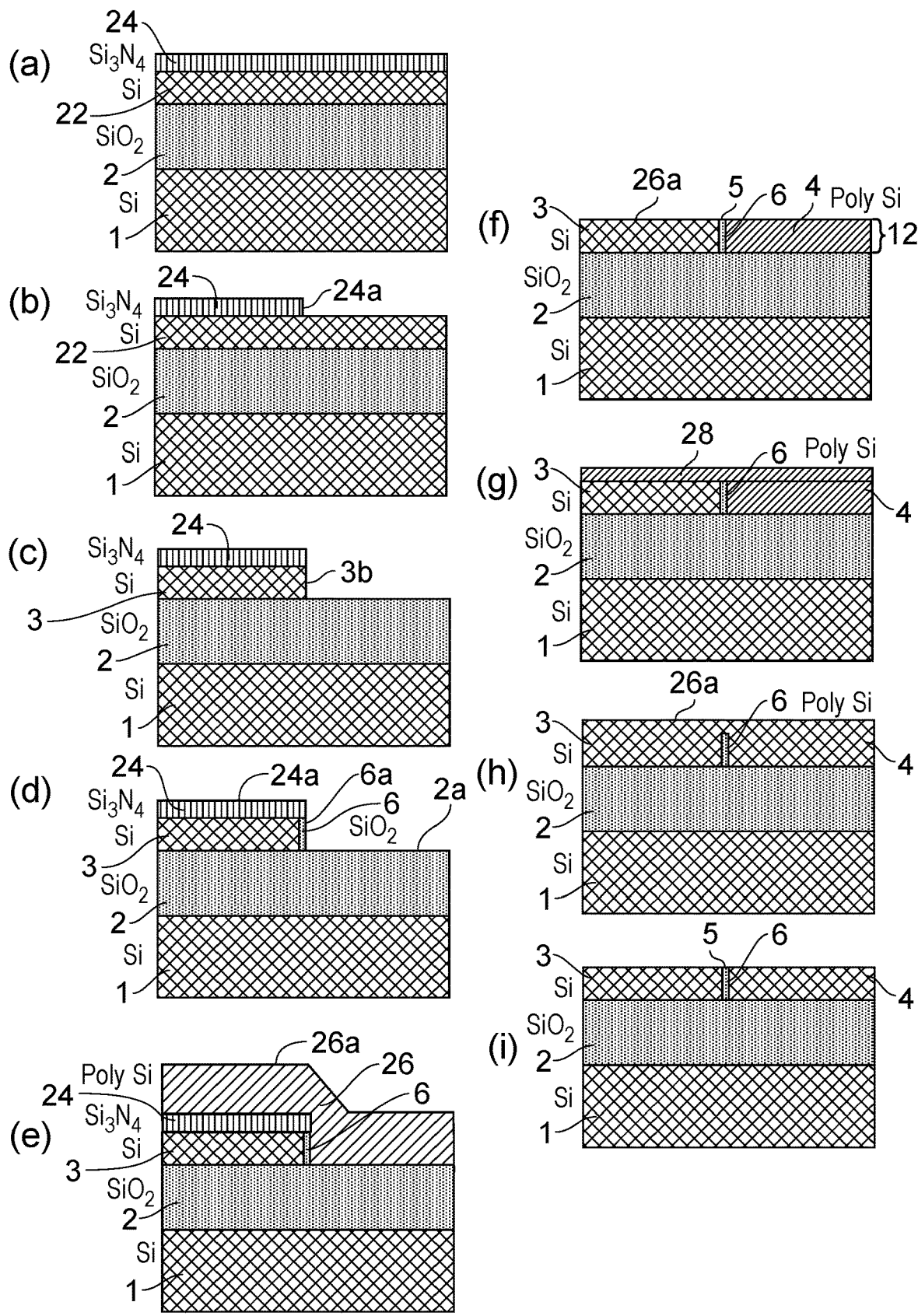
FIGS. 13(a) to 13(i) show schematic representations of an example optical structure at each stage of the FIG. 12 method.

Note that the depicted fabrication steps in FIGS. 10, 11 and 13 are examples only, and in reality the substrate and layers may extend further in the planar direction. For example, the mask be shaped to allow etching of an opening or a channel rather than removal of all the c:Si beyond the first side wall. Also, in line with common semiconductor processing the illustrated device may be merely one of many fabricated at the same time on a single wafer, so that multiple devices share a common substrate and common deposited layers, and are then separated into individual chips by dicing the wafer.

In an alternative, an etching step for creation of the first side wall of the slot may be carried out using a conventional wet or dry etching process that etches the c:Si of the configurable layer 22 to form a vertical or approximately vertical (perpendicular) wall at the edge of the mask 24 regardless of crystal orientation. The remaining steps can then be performed as previously described for FIGS. 9 and 10. A vertical slot device can thereby be created without the need for a configurable layer 22 comprising an appropriately oriented silicon crystal with vertical <111> planes. Instead, appropriate control of the etching process might be used to form a side wall at any non-parallel and non-perpendicular angle to the substrate to create an angled slot device, again without reliance on the <111> crystal plane.

Once a device with a dielectric slot in a waveguiding layer has been produced by methods such as the examples of FIGS. 9 to 13, it can be further configured for a particular electro-optic function, such as by doping for p and n type conductivities and the addition of electrical contacts, as in the FIGS. 3 and 6 examples.

Other device configurations incorporating a slot waveguide may also be provided.

Figure 14:
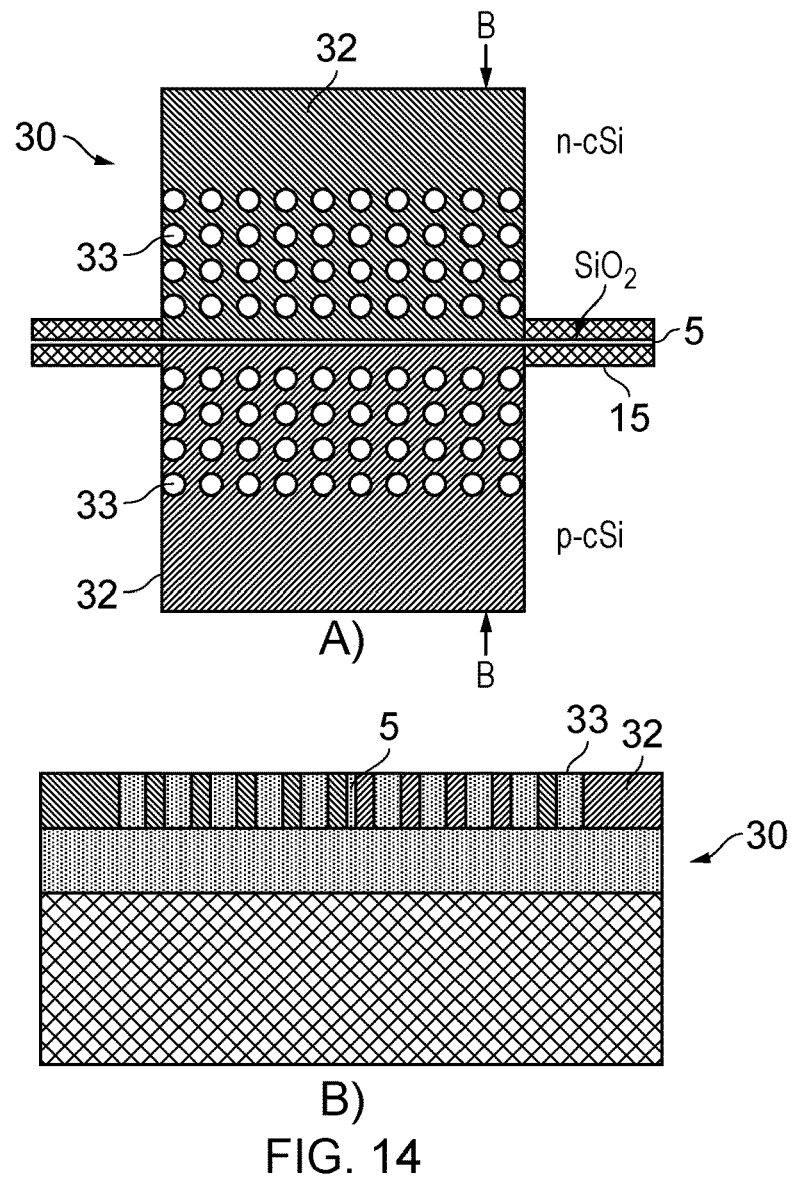
FIGS. 14A and 14B show schematic plan and cross-sectional views of a photonic waveguiding device according to an example.

FIG. 14 shows a schematic plan view (A) and a schematic cross-sectional view (B, along the line B indicated in FIG. 14A) of an example photonic crystal waveguide 30. The dielectric slot 5 (for example, comprising an oxide material such as silicon dioxide) is positioned (vertically or at an alternative angle) along the centre of a waveguiding structure 15. A photonic crystal structure 32 is arranged at each side of the waveguide, comprising a periodic nanostructure lattice or array of photonic elements 33. When the device is operated as a phase modulator, the slow light effect in the photonic crystal waveguide produced by the photonic crystal structure can greatly enhance the efficiency of the modulator.

Figure 15:
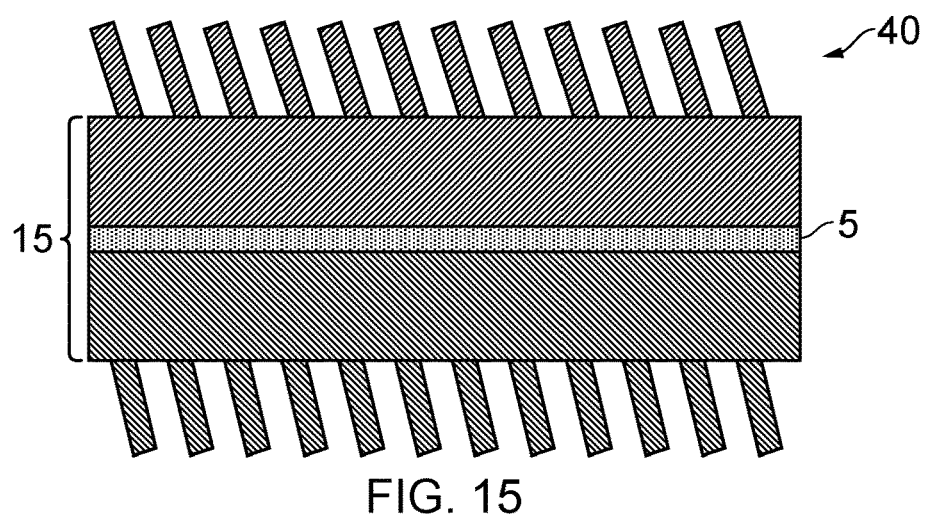
FIG. 15 shows a schematic plan view of a fin waveguiding device according to an example.

FIG. 15 shows a schematic plan view of a fin waveguide device 40. The dielectric slot 5 runs the length of the waveguide, and a plurality of angled fins 42 extend sideways from the waveguide structure 15, nonparallel to the optical propagation direction and the slot 5. The fins, which may be formed from silicon, act to physically support the waveguide structure, allowing more invasive etching to be used during fabrication. Note that the dielectric slot may form any angle with the underlying supporting substrate, in other words, it may be vertical (perpendicular to the substrate) or non-vertical (non-perpendicular to the substrate). A device of this type may be made according to any of the methods described herein, using conventional wet or dry etching or non-isotropic wet etching, and with or without the side walls of the silicon portions lying in the <111> crystal plane. Other fabrication techniques are not precluded in this instance, however, since the inclusion of a dielectric slot at any angle in a fin waveguide device has not previously been proposed.

Figure 16:
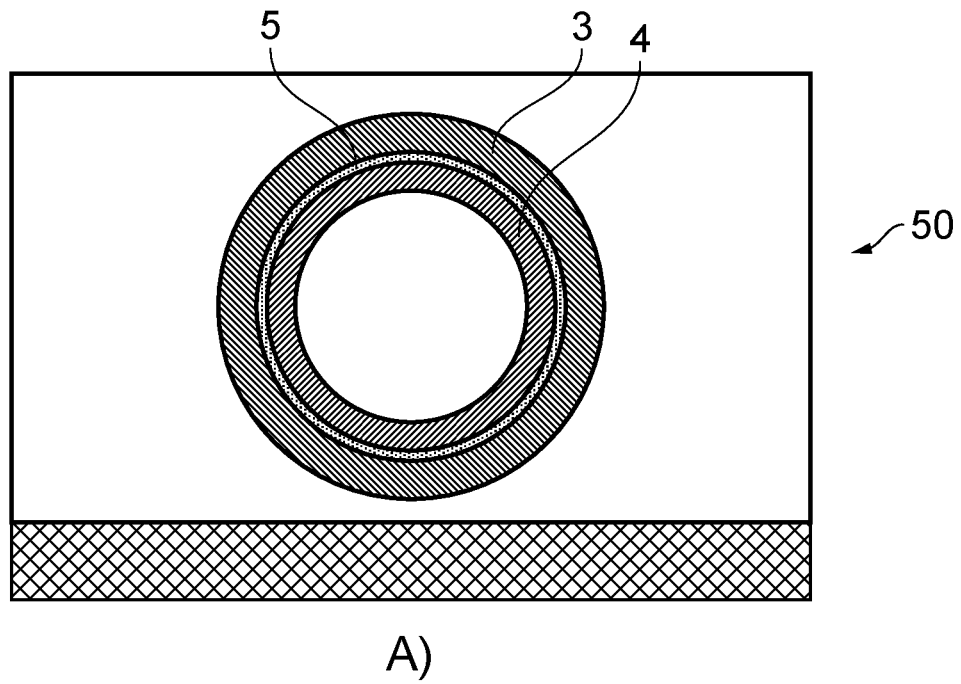
FIGS. 16A and 16B show schematic plan and cross-sectional views of a ring resonator waveguiding device according to an example.
Figure 16:
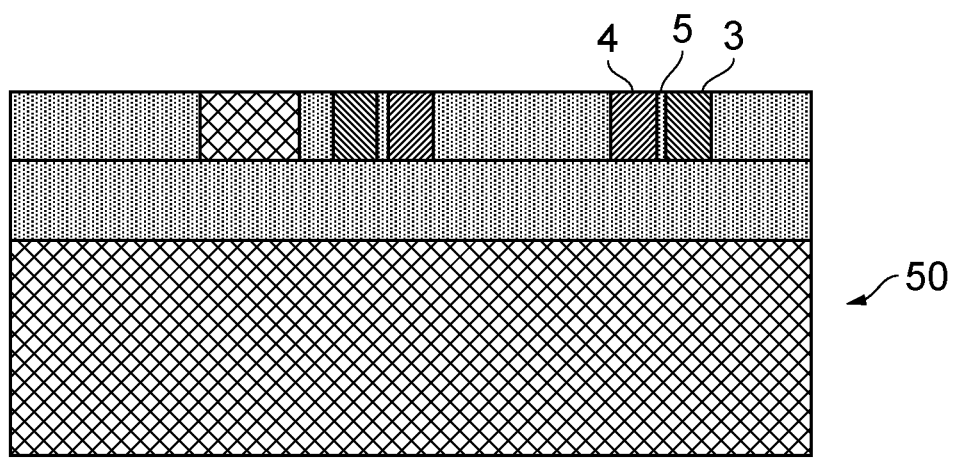

FIG. 16 shows a schematic plan view (A) and a schematic cross-sectional view (B) of a ring resonator device 50 incorporating a slot waveguide structure. Instead of a linear waveguide structure as in the previous examples, the silicon portions 3, 4 and the intervening dielectric slot 5 (sloped or vertical) are shaped into a ring, with the slot 5 disposed approximately centrally within the width of the ring (the first and second silicon portions 3, 4 have a similar width). A ring resonator has a reduced footprint compared to a linear device for the same optical path length, and power consumption for the modulator is also reduced for the same reason. When combined with the improved electro-optic interaction accessible by the accumulation mode operation of devices described herein, the power consumption for an electro-optic modulator can be additionally reduced by using a ring resonator configuration.

As discussed above, the insulating slot structure can be formed by a sequence of etching and deposition or growth steps that builds up the slot from layers, namely: anisotropic crystallographic etching of c:Si to form a first slot wall, deposition of an (ultra)thin layer of insulating material over the surface of the first wall, and deposition of further silicon over the insulating layer thereby forming a second slot wall in contact with the insulating material. This procedure enables the fabrication of slots which can be not only exceptionally narrow (thin insulating layer)—or indeed of any width to great accuracy—but also have very smooth walls. This improves transmission through a waveguide incorporating such a slot, compared to earlier slot structures, since surface roughness at the interfaces between the insulating material and the confining slot walls can contribute significant optical loss.

Figure 17:
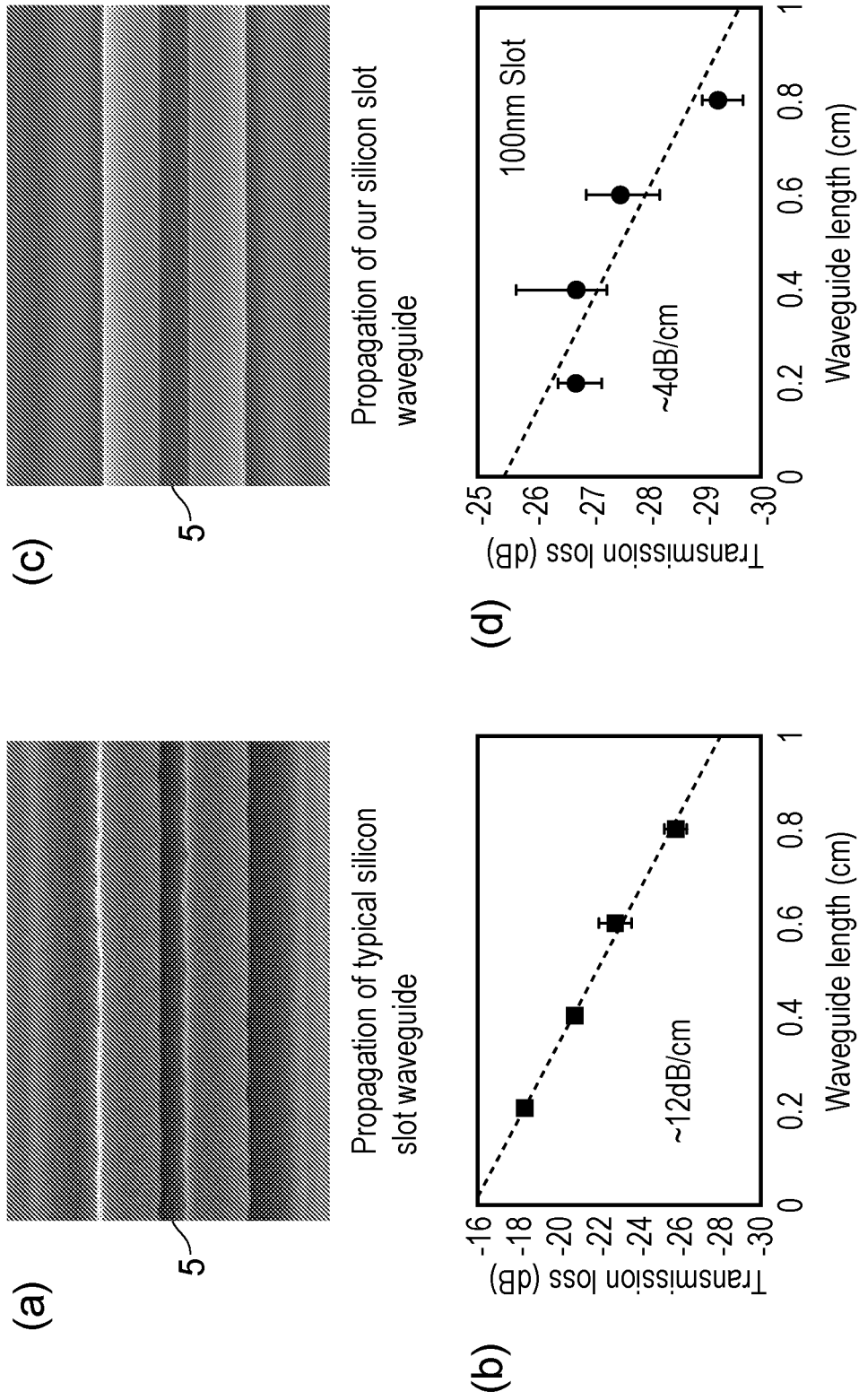
FIGS. 17(a) to 17(d) images of a prior art optical structure and an example optical structure together with graphs showing the optical transmission loss for each structure.

FIG. 17 shows example measurements demonstrating such improvement. FIG. 17(a) shows a scanning electron microscope image of a slot waveguide made using a technique that gives roughness in the slot walls (such as by conventional etching of the slot in a single step, and subsequent filling with dielectric). The uneven slot walls can be discerned, defining the slot 5. FIG. 17(b) shows a graph of optical transmission loss through the waveguide of FIG. 17(a). Over a one centimetre waveguide length, an optical loss of about 12 dB occurs for a wavelength of 1550 nm.

FIG. 17(c) shows an image of a slot waveguide made using a method according to an example embodiment of the invention, in which the walls of the slot are in the <111> silicon crystal plane. The superior smoothness compared to the waveguide of FIG. 17(a) can be appreciated. In this example, the slot is filled with silicon dioxide and has a width of 100 nm. For both waveguides (FIGS. 17(a) and 17(c), the waveguide height is 220 nm and the width of the silicon portions on each side of the slot is 225 nm. FIG. 17(d) shows a graph of optical transmission loss through the waveguide of FIG. 17(c). Over a one centimetre waveguide length, an optical loss of about 4 dB occurs, representing a three-fold improvement in transmission loss. Given that a modulator can be fabricated in a far shorter length of waveguide than one centimetre, owing to the strong electro-optic effect offered in accumulation mode, actual loss in a working device will be far lower. Moreover, with refinements in fabrication, it is expected that transmission losses could be reduced still further, to around 3 dB per cm or less, or around 1 dB per cm or less.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

REFERENCES

[1] U.S. Pat. No. 6,845,198
[2] U.S. Pat. No. 8,362,494
[3] U.S. Pat. No. 9,310,629

The invention claimed is:

1. A method of fabricating an optical structure, the method comprising:
  providing a layer of single crystal crystalline silicon supported on an insulating surface of a silicon substrate;
  using etching to remove part of the silicon layer and define a side wall which is non-parallel to the insulating surface of the substrate;
  forming a layer of insulating material over the side wall;
  forming a further layer of silicon over at least the insulating material;
  crystallising the silicon of the further layer so that it forms a single crystal structure with the silicon in the layer, in which the crystallisation uses the silicon in the layer as a seed; and
  removing the silicon of the further layer to a level of the layer of silicon such that the layer of insulating material occupies a slot between a portion of silicon in the layer and a portion of silicon in the further layer, a thickness of the layer of insulating material defining a width of the slot.

2. A method according to claim 1, in which the etching is anisotropic wet etching.

3. A method according to claim 1, in which the layer of single crystal crystalline silicon is supported on the insulating surface of the silicon substrate so that the <111> crystal plane of the silicon is non-parallel to the insulating surface, and in which the etching defines a side wall lying in the <111> crystal plane.

4. A method according to claim 1, in which the layer of single crystal crystalline silicon is arranged so that its <111> crystal plane is at an angle to the insulating surface in the range of 42 degrees to 48 degrees, or 40 degrees to 50 degrees, or 35 degrees to 55 degrees, or 30 degrees to 60 degrees.

5. A method according to claim 1, in which the layer of single crystal crystalline silicon is arranged so that its <111> crystal plane is substantially orthogonal to the insulating surface.

6. A method according to claim 1, in which the etching defines the side wall to be at an angle to the insulating surface of the substrate in the range of 42 degrees to 48 degrees, or 40 degrees to 50 degrees, or 35 degrees to 55 degrees, or 30 degrees to 60 degrees, or at an angle of 54.7 degrees to the insulating surface, or at an angle of substantially 45 degrees to the insulating surface, or substantially orthogonal to the insulating surface.

7. An optical structure comprising:
  a silicon substrate with a surface insulating layer;
  a first portion of silicon supported on the insulating surface of the substrate and having a first side wall non-parallel and non-perpendicular to the said insulating surface, the silicon being single crystal crystalline silicon;
  a second portion of silicon supported on the insulating surface of the substrate and having a second side wall non-parallel and non-perpendicular to the said insulating surface and facing the first side wall so as to define a slot between the first and second side walls; and
  an insulating material disposed in the slot.

8. An optical structure according to claim 7, in which the first side wall lies in the <111> crystal plane of the first portion of silicon.

9. An optical structure according to claim 7, in which the first and second portions of silicon and the insulating material define a waveguiding plane and the slot extends in an optical propagation direction through the waveguiding plane.

10. An optical structure according to claim 7, in which the second portion of silicon is polycrystalline silicon or amorphous silicon.

11. An optical structure according to claim 7, in which the second portion of silicon is single crystal crystalline silicon.

12. An optical structure according to claim 11, in which the second side wall lies in the <111> crystal plane of silicon of the second portion of silicon.

13. An optical structure according to claim 7, in which the insulating material is a dielectric material.

14. An optical structure according to claim 7, in which the first side wall is at an angle to the insulating surface of the substrate in the range of 42 degrees to 48 degrees, or 40 degrees to 50 degrees, or 35 degrees to 55 degrees, or 30 degrees to 60 degrees.

15. An optical structure according to claim 7, in which the first side wall and the second side wall are parallel to each other, so as to define a slot of a constant width.

16. An optical structure according to claim 7, in which the first side wall and the second side wall are non-parallel to each other.

17. An optical or electro-optical device comprising an optical structure according to claim 7.

18. An optical waveguiding structure comprising:
  a silicon substrate with a surface insulating layer;
  a first portion of silicon supported on the insulating surface of the substrate and having a first side wall non-parallel to the said insulating surface, the silicon being single crystal crystalline silicon;
a second portion of silicon supported on the insulating surface of the substrate and having a second side wall non-parallel to the said insulating surface and facing the first side wall so as to define a slot between the first and second side walls; and
an insulating material disposed in the slot;
in which the first and second portions of silicon and the insulating material define a waveguiding plane and the slot extends in an optical propagation direction through the waveguiding plane; and
the structure further comprises a plurality of supporting fins extending from side walls of the first and second portions of silicon opposite to the first and second side walls in a direction non-parallel to the optical propagation direction.

\* \* \* \* \*